US011280900B2

(12) United States Patent
Kim et al.

(10) Patent No.: US 11,280,900 B2
(45) Date of Patent: Mar. 22, 2022

(54) APPARATUS FOR COMPENSATING PHASE ERROR OF CHIRP SIGNAL

(71) Applicant: AJOU UNIVERSITY INDUSTRY-ACADEMIC COOPERATION FOUNDATION, Suwon-si (KR)

(72) Inventors: Jae Hyun Kim, Seoul (KR); Kyeongrok Kim, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 17/148,689

(22) Filed: Jan. 14, 2021

(65) Prior Publication Data

US 2021/0302568 A1 Sep. 30, 2021

(30) Foreign Application Priority Data

Mar. 25, 2020 (KR) .................. KR10-2020-0036185

(51) Int. Cl.
*G01S 13/90* (2006.01)
*G01S 7/35* (2006.01)

(52) U.S. Cl.
CPC ............ *G01S 13/9094* (2013.01); *G01S 7/35* (2013.01)

(58) Field of Classification Search
CPC ............................... G01S 13/9094; G01S 7/35
See application file for complete search history.

(56) References Cited

U.S. PATENT DOCUMENTS

2016/0370457 A1* 12/2016 Ryu ..................... G01S 7/354

FOREIGN PATENT DOCUMENTS

| JP | 11-109021 A | 4/2012 |
| KR | 10-1133526 B1 | 4/2012 |
| KR | 10-1879516 B1 | 7/2018 |
| KR | 10-2020-0010816 A | 1/2020 |

* cited by examiner

*Primary Examiner* — Timothy A Brainard
(74) *Attorney, Agent, or Firm* — Sughrue Mion, PLLC

(57) ABSTRACT

The present invention provides an apparatus for compensating a phase error of an RF band chirp signal by pre-distorting a base band chirp signal, including: a waveform generator to output the base band chirp signal; an RF modulator to output the RF band chirp signal by upconverting the base band chirp signal; an error calculation unit to calculate a phase error over time for a predetermined time by comparing the RF band chirp signal with an ideal chirp signal; a section division unit to divide the predetermined time into a plurality of time sections; a section combination unit to combine neighboring time sections based on the phase error; and a phase distortion unit to distort phase of the base band chirp signal in the combined time sections based on the phase error.

11 Claims, 8 Drawing Sheets

APPARATUS FOR COMPENSATING PHASE ERROR OF CHIRP SIGNAL

CROSS-REFERENCE TO RELATED APPLICATION

This application claims priority to and the benefit of Korean Patent Application No. 10-2020-0036185 filed on Mar. 25, 2020, in the Korean Intellectual Property Office, the contents of which are incorporated herein by reference in their entirety.

BACKGROUND

1. Field of the Invention

The present invention relates to an apparatus for compensating phase error of chirp signal.

2. Discussion of Related Art

An synthetic aperture radar (SAR), an equipment mounted and operated on a moving platform, radiates microwaves, receives a signal scattered from a target, calculates the distance from the position of the radar to the target by measuring the signal from transmission to reception, and estimates the target from which the signal is reflected by analyzing the characteristics of the reflected signal.

Specifically, the SAR generates a chirp signal suitable for the purpose of the SAR through a waveform generator to obtain an image. Then, the chirp signal generated by the waveform generator is converted into an analog signal and amplified by a radio frequency (RF) modulator. Then, the amplified signal is transmitted by an antenna, and the transmitted signal collides with an observation object and is backscattered, and the antenna receives the backscattered signal again. Here, since the intensity of the received signal is very small, image processing is performed after amplifying again.

The waveform generator of the SAR is divided into an analog waveform generator and a digital waveform generator depending on the method of generating the waveform, and the digital waveform generator is again divided into a memory map type waveform generator and a direct digital synthesizer (DDS) type waveform generator.

Since the memory map type waveform generator outputs and uses the signal stored in the memory, the reliability of the signal is excellent, but a large capacity memory is used to store data. Therefore, the weight of the satellite increases due to the memory, and signal output is hindered if the memory is damaged.

The DDS type waveform generator generates a chirp signal through a signal generation algorithm. Such a DDS type waveform generator has not better signal characteristic than the memory map type waveform generator, but has the advantage that it can reduce the weight of the satellite and has a relatively low dependence on memory.

As such, the reason why the signal characteristic is not good in the DDS type is a distortion phenomenon that occurs in the process of generating a signal in the algorithm method. This distortion phenomenon occurs because a value composed of samples does not become exactly a desired value in the process of generating the desired value by collecting samples in a digital method.

For this reason, most of the SAR satellites currently use the memory map type. However, if the signal characteristic of the DDS type waveform generator is improved, the weight of the satellite may be reduced and the signal characteristic may transmit signals similar to those of the existing memory map type. So, research to improve the characteristic of the signal occurring in the DDS is ongoing worldwide.

The above information disclosed in this Background section is only for enhancement of understanding of the background of the invention and it may therefore contain information that does not form the prior art that is already known to a person of ordinary skill in the art.

SUMMARY OF THE INVENTION

The present invention is directed to providing an apparatus for compensating phase error of chirp signal capable of efficiently compensating a phase error and reducing the complexity compared to compensating the phase error for the entire time sections.

The technical problems to be achieved in the present invention are not limited to the technical problems mentioned above, and other technical problems not mentioned will be clearly understood by those of ordinary skill in the art from the following description.

The present invention is directed to providing an apparatus for compensating a phase error of an RF band chirp signal by pre-distorting a base band chirp signal, including: a waveform generator to output the base band chirp signal; an RF modulator to output the RF band chirp signal by upconverting the base band chirp signal; an error calculator to calculate a phase error over time for a predetermined time by comparing the RF band chirp signal with an ideal chirp signal; a section divider to divide the predetermined time into a plurality of time sections; a section combiner to combine neighboring time sections based on the phase error; and a phase distorter to distort phase of the base band chirp signal in the combined time sections based on the phase error.

Here, the error calculator calculates an average of the phase errors (a section error average) for each of the time sections, and calculates an average of the phase errors for all the plurality of time sections (an entire error average).

In addition, the section combiner combines the time sections in which the absolute value of the section error average is greater than the absolute value of the entire error average.

In addition, the error calculator calculates an average of the phase errors for the combined time sections (a combined section error average).

In addition, the phase distorter shifts the phase of the base band chirp signal based on the combined section error average.

In addition, the phase distorter subtracts the combined section error average from the phase of the base band chirp signal.

In addition, the present invention is directed to providing an apparatus for compensating a phase error of an RF band chirp signal by pre-distorting a base band chirp signal, including: a waveform generator to output the base band chirp signal; an RF modulator to output the RF band chirp signal by upconverting the base band chirp signal; an error calculator to calculate a phase error over time for a predetermined time by comparing the RF band chirp signal with an ideal chirp signal; a section divider to divide the predetermined time into a plurality of time sections based on a point where the phase error over time is 0; a phase distorter to distort phase of the base band chirp signal in the divided time sections based on the phase error.

In addition, the apparatus for compensating phase error of chirp signal according to the present invention may further include an analyzer to calculate a second-order polynomial by performing a linear regression analysis on the phase error in the divided time sections.

In addition, the analyzer calculates a linear regression value by solving the second-order polynomial for the divided time sections.

In addition, the phase distorter shifts the phase of the base band chirp signal based on the linear regression value.

In addition, the phase distorter subtracts the linear regression value from the phase of the base band chirp signal.

According to the present invention, it is possible to combine the time sections that have great effect on the entire error average and perform the pre-distortion only on the combined sections, thereby efficiently compensating the phase error, and reducing the complexity compared to compensating the phase error for the entire time sections.

In addition, according to the present invention, it is possible to divide the entire time sections into time sections having a negative value for phase error and time sections having a positive value for phase error, and perform the pre-distortion for each time section, thereby efficiently compensating the phase error, and reducing the complexity compared to compensating the phase error for the entire time sections at once.

The effects of the present invention are not limited to those mentioned above, and other effects not mentioned will be clearly understood by those of ordinary skill in the art from the following description.

BRIEF DESCRIPTION OF THE DRAWINGS

The above and other aspects, features, and advantages of the present invention will become more apparent to those of ordinary skill in the art by describing embodiments thereof in detail with reference to the accompanying drawings, in which.

DETAILED DESCRIPTION OF EXAMPLE EMBODIMENTS

Figure 1:
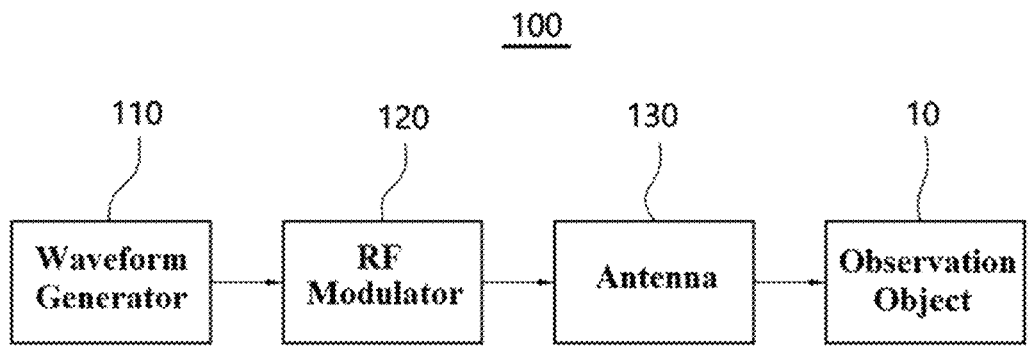
FIG. 1 is a schematic block diagram of an synthetic aperture radar (SAR) according to an exemplary embodiment of the present invention.

Terms or words used in the present specification and claims should not be construed as limited to their usual or dictionary definition, and they should be interpreted as a meaning and concept consistent with the technical idea of the present invention based on the principle that inventors may appropriately define the concept of terms in order to describe their own invention in the best way.

Accordingly, the embodiments described in the present specification and the configurations shown in the drawings are only the most preferred embodiments of the present invention, and do not represent all the technical spirit of the present invention, so it should be understood that there may be various examples of equivalent and modification that can replace them at the time of filing the present invention.

Hereinafter, exemplary embodiments of the present invention will be described in detail so that those of ordinary skill in the art can readily implement the present invention with reference to the accompanying drawings.

FIG. 1 is a schematic block diagram of an synthetic aperture radar (SAR) according to an exemplary embodiment of the present invention.

As shown in FIG. 1, an SAR 100 according to an embodiment of the present invention may include a waveform generator 110, an RF modulator 120, and an antenna 130.

The waveform generator 110 generates and outputs a base band chirp signal in a direct digital synthesizer (DDS) method.

Meanwhile, in the SAR 100, the narrower the signal width is, the better the resolution is, but, since there is a technical limitation in transmitting a signal by compressing the same amount of electricity into a short signal, the SAR 100 uses a chirp signal. The chirp signal will be described later in detail.

The waveform generator 110 stores an algorithm for generating a signal in memory and generates a signal using this algorithm. Here, since the size of the algorithm is relatively smaller than the size of the data of the signal itself, the dependence on the memory is small. Therefore, the volume and weight of the memory are reduced, but power consumption increases because a signal is generated every moment. However, this may be used in a wide variety because it has the advantage of generating a desired signal according to a desired operation method and mission conditions based on an algorithm.

The waveform generator 110 may generate a signal by using an algorithm such as a chirp rate and a look up table (LUT) of a trigonometric function.

A user or manufacturer of the waveform generator 110 may determine the chirp rate suitable for the mission condition of the SAR 100.

Here, the chirp rate is accumulated while circulating through an adder loop to form a linear equation with respect to time to generate a frequency value of the chirp signal. As such, the frequency of the chirp signal generated in the loop generating the frequency of the chirp signal is accumulated while circulating through the adder loop once again to form a quadratic equation with respect to time to generate a phase value of the chirp signal. The chirp signal generated as described above is matched to a cosine LUT to generate I data of the chirp signal, and then matched to a sine LUT to generate Q data. Then, the generated I data and Q data are converted to analog signals through a digital to analog converter (DAC) to generate a chirp signal.

The RF modulator 120 outputs a radio frequency (RF) band chirp signal by upconverting a base band chirp signal received from the waveform generator 110. Here, the RF band may include, but not limited to, an L-band, C-band, X-band, and Ku-band used for satellite synthetic aperture radar (SAR).

The RF band chirp signal is transmitted to the outside by the antenna 130 and the transmitted signal collides with an observation object 10 and is backscattered. At this time, the SAR 100 estimates the observation object 10 by receiving the backscattered signal and processing the image.

Figure 2:
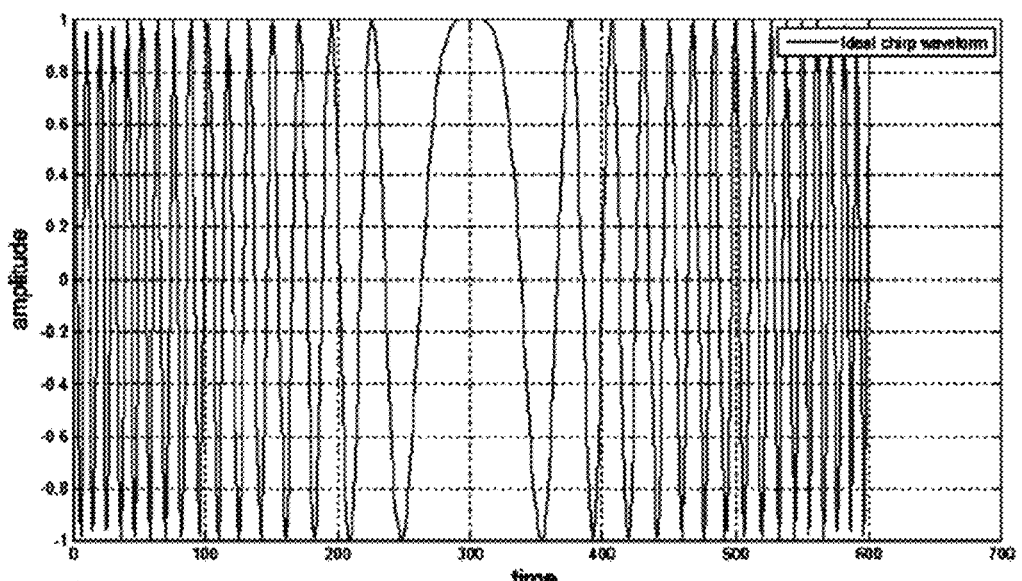
FIG. 2 is a graph showing a waveform of an ideal chirp signal.

FIG. 2 is a graph showing a waveform of an ideal chirp signal.

The chirp signal is a signal whose frequency changes over time and is a type of linear frequency modulation (LFM) signal. The chirp signal can be classified into a rising chirp whose frequency increases over time and a descending chirp whose frequency decreases over time, and a chirp signal having a rising chirp and a descending chirp together based on a center frequency is called a bidirectional chirp signal.

As shown in FIG. 2, for the ideal chirp signal, the frequency increases and decrease over time, and a phase distortion phenomenon does not occur in the portion of center frequency.

Figure 3:
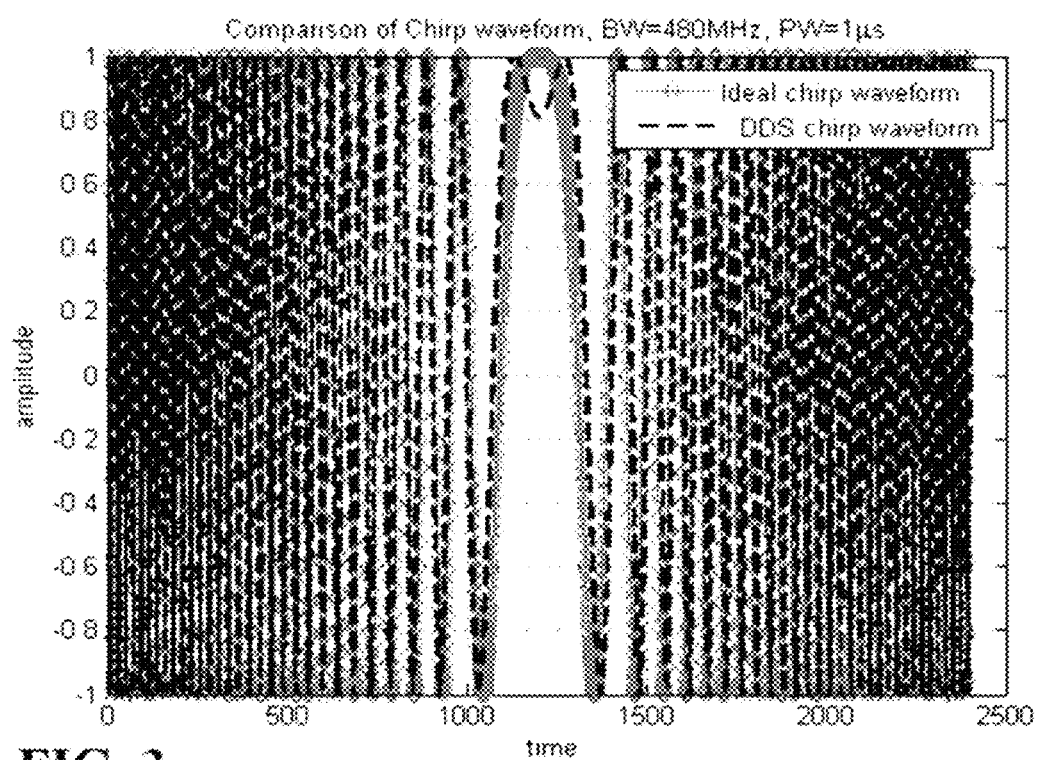
FIG. 3 is a graph comparing an ideal chirp signal and a chirp signal having a distortion phenomenon.

FIG. 3 is a graph comparing an ideal chirp signal and a chirp signal having a distortion phenomenon.

In FIG. 3, an ideal chirp signal is indicated by a solid line, and an actual chirp signal having a distortion phenomenon is indicated by a dotted line.

Referring to FIG. 3, it can be seen that the actual chirp signal is not in a form of a perfect cosine function in the portion of center frequency, but in a form in which the phase is slightly shifted. That is, a phase error occurs between the ideal chirp signal and the actual chirp signal in the DC portion where the frequency is 0.

Figure 4:
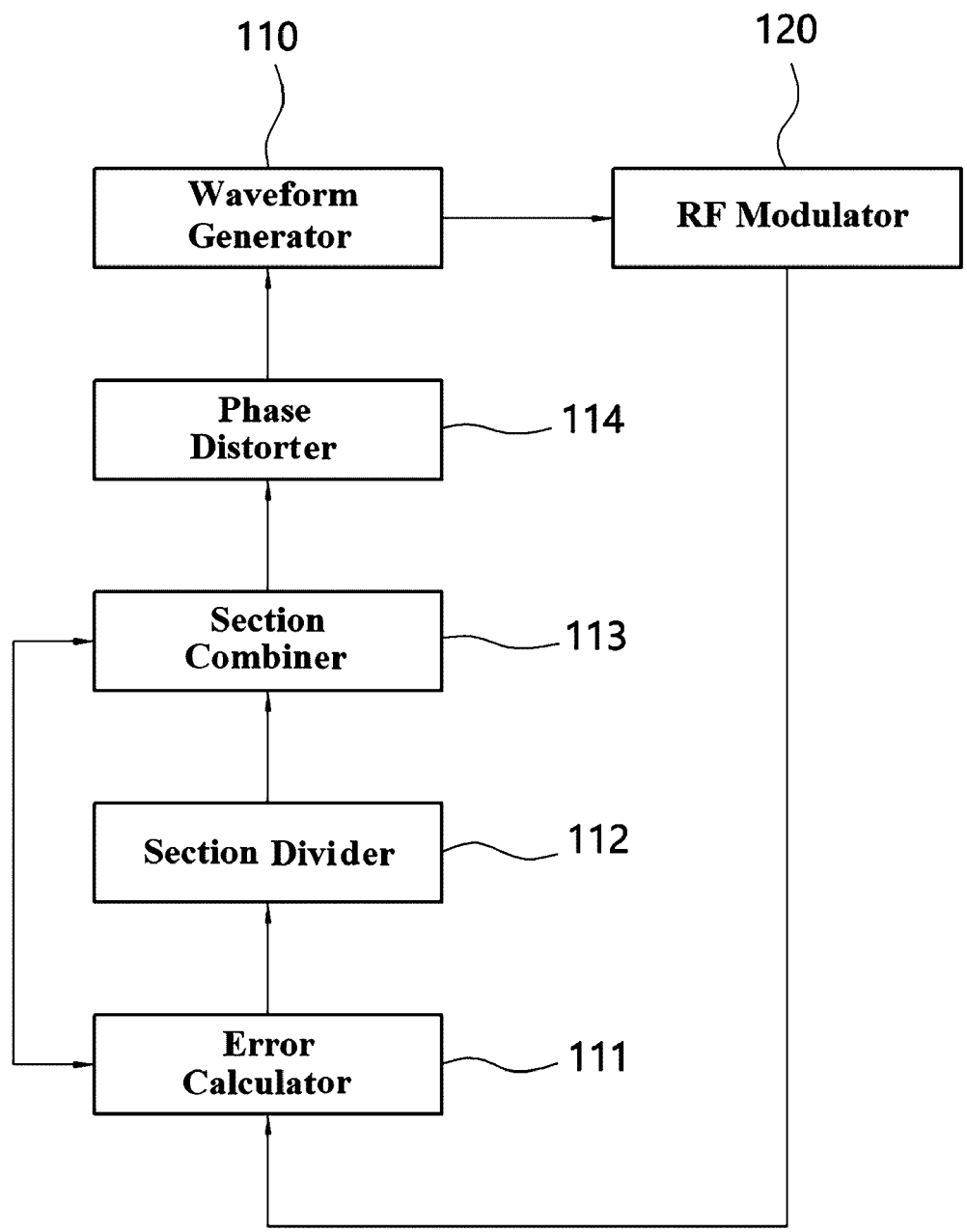
FIG. 4 is a block diagram of an apparatus for compensating phase error of chirp signal according to a first embodiment of the present invention.
Figure 5A:
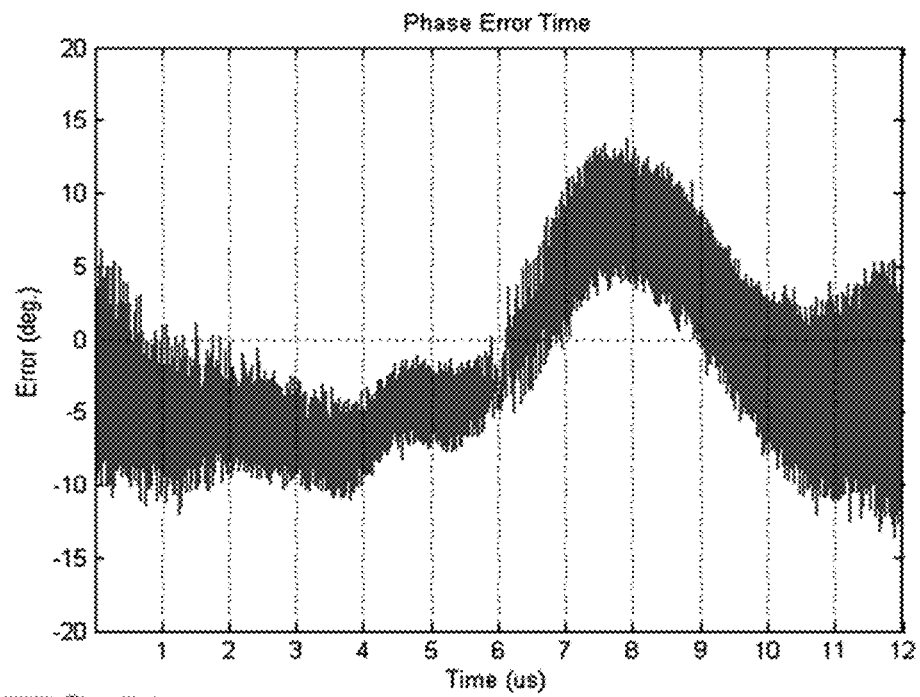
FIGS. 5A to 5C are graphs showing a phase error of a chirp signal with respect to time, for describing an operation of the apparatus for compensating phase error of chirp signal according to the first embodiment of the present invention.
Figure 5B:
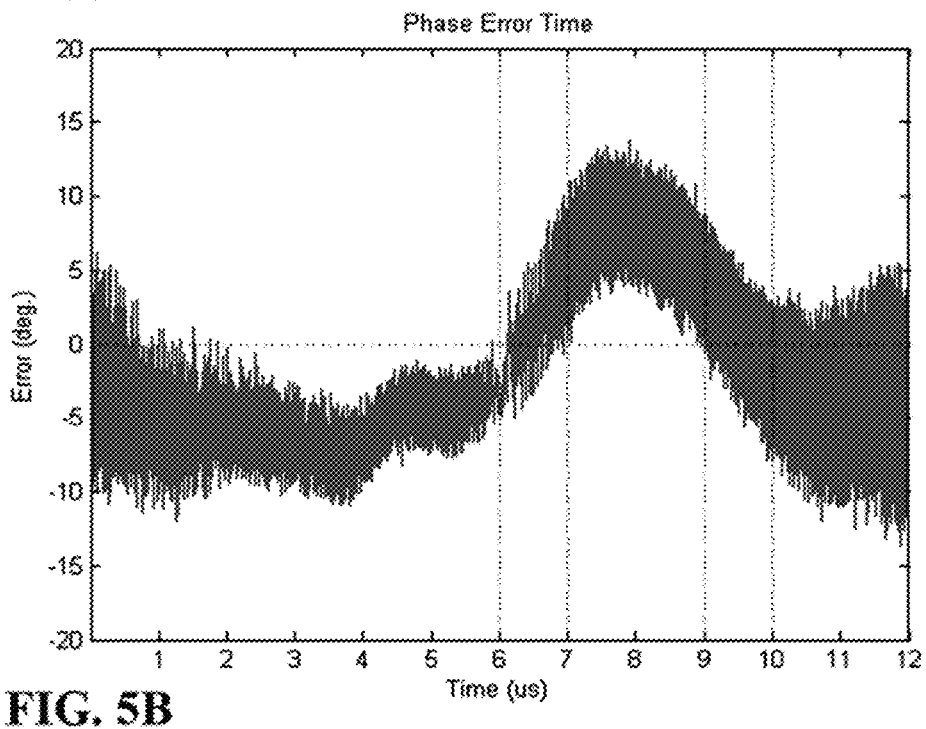
Figure 5C:
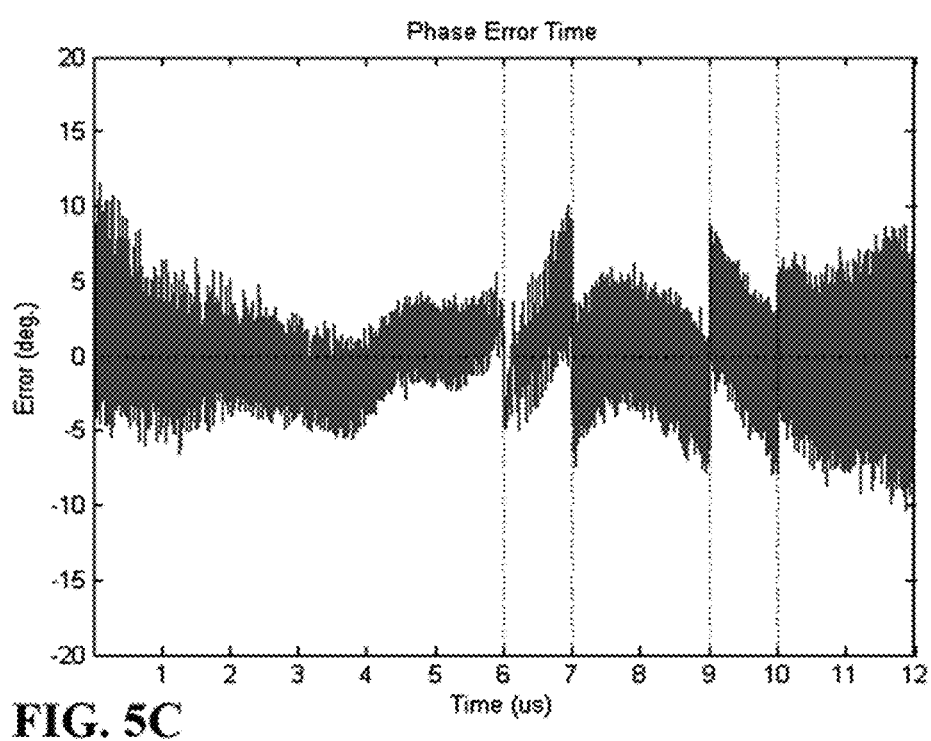

FIG. 4 is a block diagram of an apparatus for compensating phase error of chirp signal according to a first embodiment of the present invention and FIGS. 5A to 5C are graphs showing a phase error of a chirp signal with respect to time, for describing an operation of the apparatus for compensating phase error of chirp signal according to the first embodiment of the present invention.

As shown in FIG. 4, the apparatus for compensating phase error of chirp signal according to the first embodiment of the present invention is an apparatus for compensating a phase error of an RF band chirp signal by pre-distorting a base band chirp signal and may include an error calculator 111, a section divider 112, a section combiner 113, and a phase distorter 114.

The error calculator 111 calculates a phase error over time for a predetermined time (e.g., 0 to 12 μs) by comparing an RF band chirp signal with an ideal chirp signal. In this case, the phase error for each time may have a certain range vertically due to signal noise.

As shown in FIG. 5A, the section divider 112 divides a predetermined time (e.g., 0 to 12 μs) into a plurality of time sections (e.g., in units of 1 μs) (indicated by dotted lines).

Here, the error calculator 111 calculates an average of the phase errors (hereinafter, a section error average) for each of the plurality of time sections divided in units of 1 μs, and calculates an average of the phase errors for all the plurality of time sections (hereinafter, an entire error average).

As shown in FIG. 5B, the section combiner 113 combines neighboring time sections based on the section error average and the entire error average received from the error calculator 111.

Specifically, the section combiner 113 compares the absolute value of the section error average and the absolute value of the entire error average, determines a time section in which the absolute value of the section error average is greater than the absolute value of the entire error average, and combines neighboring time sections among the determined time sections.

Table 1 below is a table showing an average of the phase error of the chirp signal with respect to time shown in FIG. 5A for each time section.

TABLE 1

| | Time Section | Average of Error | Condition |
|---|---|---|---|
| PE | 0~12 | −1.805 | |
| S0 | 0~1 | −4.369 | PD1 |
| S1 | 1~2 | −5.571 | |
| S2 | 2~3 | −6.067 | |
| S3 | 3~4 | −7.284 | |
| S4 | 4~5 | −4.888 | |
| S5 | 5~6 | −4.106 | |
| S6 | 6~7 | −1.200 | |
| S7 | 7~8 | 7.780 | PD2 |
| S8 | 8~9 | 7.010 | |
| S9 | 9~10 | 1.125 | |
| S10 | 10~11 | −3.471 | PD3 |
| S11 | 11~12 | −3.020 | |

Table 1 shows the average of the phase error for the entire time sections (PE) and the average of the error for each time section (S0 to S11).

In Table 1, it can be seen that the absolute value of the section error average is greater than the absolute value of the entire error average in the sections S0 to S5, S7 to S8, and S10 to S11 when comparing the absolute value of the entire error average and the absolute value of the section error average by time section.

Here, if the absolute value of the section error average is greater than the absolute value of the entire error average, it means that the phase error is relatively large, and if the absolute value of the section error average is less than the absolute value of the entire error average, it means that the phase error is relatively small. That is, the time section in which the absolute value of the section error average is greater than the absolute value of the entire error average has a great effect on the total phase error.

In addition, since S0 to S5 are neighboring time sections, S7 to S8 are neighboring time sections, and S10 to S11 are neighboring time sections, as shown in FIG. 5B and Table 1, the section combiner 113 combines S0 to S5, S7 to S8, and S10 to S11, respectively.

The error calculator 111 calculates an average of the phase errors for the combined time sections (hereinafter, a combined section error average). In the above-described example, the combined section error averages of S0 to S5, S7 to S8, and S10 to S11 are calculated, respectively.

The phase distorter 114 respectively distorts the phase of the base band chirp signal in the combined time sections based on the combined section error average. That is, referring to Table 1, pre-distortion (Pre-Distortion1; PD1) is performed in S0 to S5, pre-distortion (Pre-Distortion2; PD2) is performed in S7 to S8, and pre-distortion (Pre-Distortion3; PD3) is performed in S10 to S11.

Specifically, the phase distorter 114 shifts the phase of the base band chirp signal by inputting a constant value for shifting the phase center based on the combined section error average received from the error calculator 111. That is, the phase distorter 114 subtracts the combined section error average from the phase of the base band chirp signal.

Referring to FIG. 5C, the phase is increased because the combined section error average has a negative value in S0 to S5 and S10 to S11, and the phase is decreased because the combined section error average has a positive value in S7 to S8.

As described above, the apparatus for compensating phase error of chirp signal according to the first embodiment of the present invention combines the time sections that have great effect on the entire error average and performs the pre-distortion only on the combined sections (S0 to S5, S7 to S8, and S10 to S11), thereby efficiently compensating the phase error, and reducing the complexity compared to compensating the phase error for the entire time sections.

Figure 6:
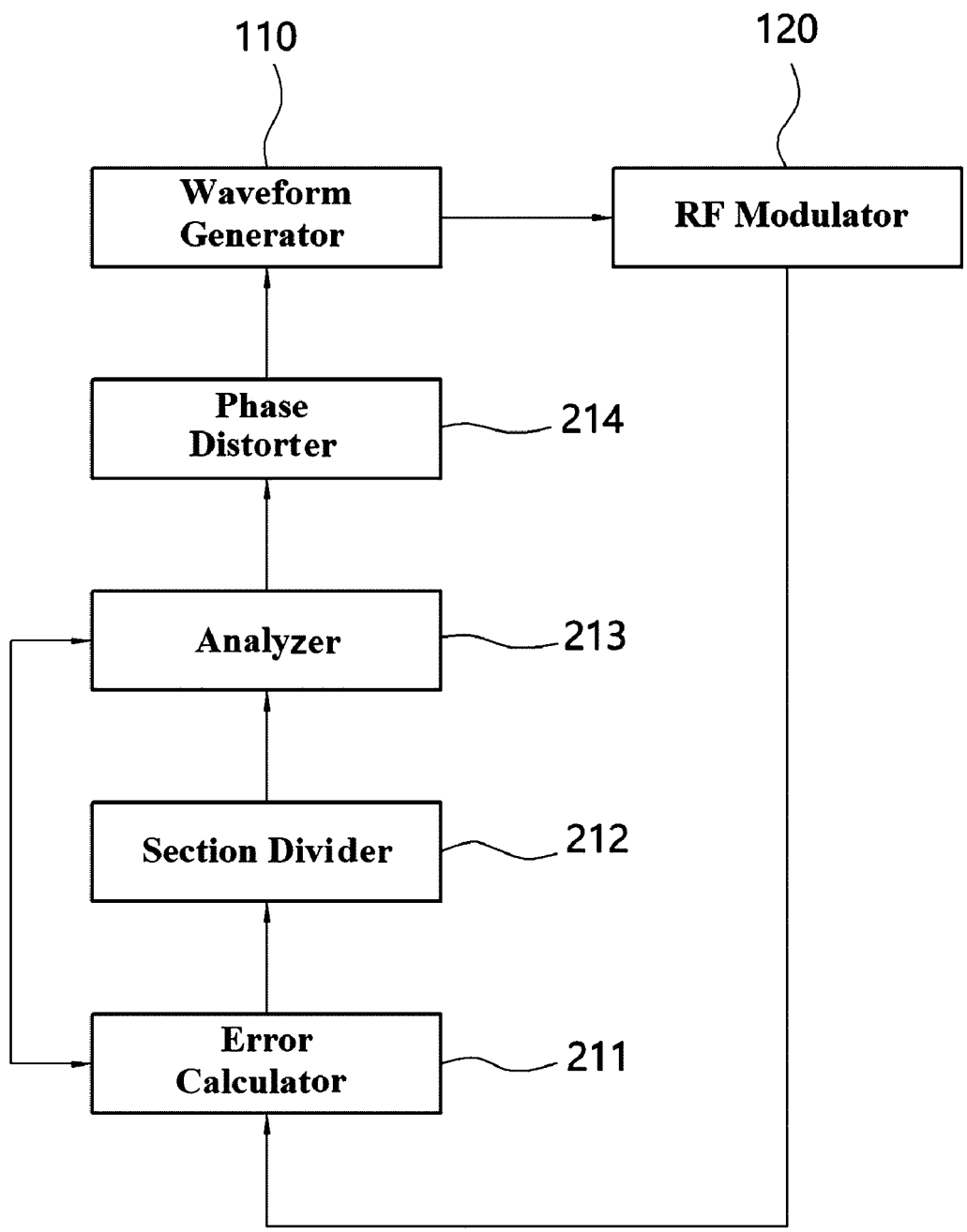
FIG. 6 is a block diagram of an apparatus for compensating phase error of chirp signal according to a second embodiment of the present invention.

FIG. 6 is a block diagram of an apparatus for compensating phase error of chirp signal according to a second embodiment of the present invention and FIGS. 7A to 7D are graphs showing a phase error of a chirp signal with respect to time, for describing an operation of the apparatus for compensating phase error of chirp signal according to the second embodiment of the present invention.

As shown in FIG. 6, the apparatus for compensating phase error of chirp signal according to the second embodiment of the present invention is an apparatus for compensating a phase error of an RF band chirp signal by pre-distorting a base band chirp signal and may include an error calculator 211, a section divider 212, an analyzer 213, and a phase distorter 214.

The error calculator 211 calculates a phase error over time for a predetermined time (e.g., 0 to 12 µs) by comparing an RF band chirp signal with an ideal chirp signal. In this case, the phase error for each time may have a certain range vertically due to signal noise.

Figure 7A:
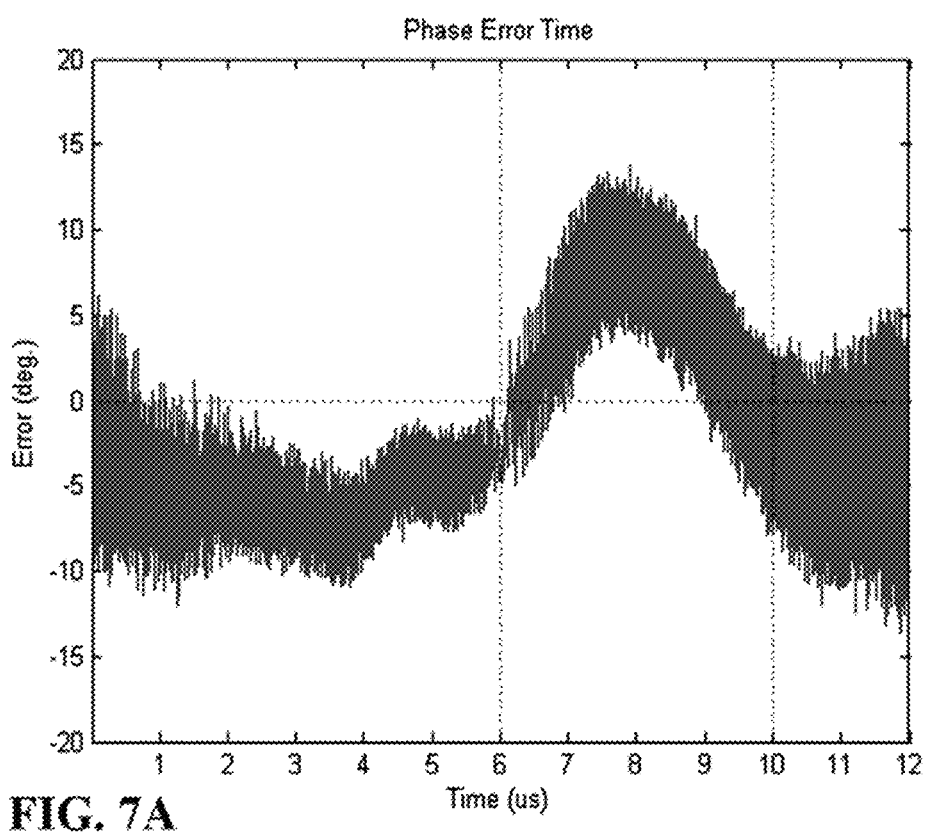
FIGS. 7A to 7D are graphs showing a phase error of a chirp signal with respect to time, for describing an operation of the apparatus for compensating phase error of chirp signal according to the second embodiment of the present invention.

As shown in FIG. 7A, the section divider 212 divides a predetermined time (e.g., 0 to 12 µs) into a plurality of time sections (e.g., 0 to 6 µs, 6 to 10 µs, and 10 to 12 µs) (indicated by dotted lines) based on a point where the phase error over time is 0. When time sections are divided in this manner, they are divided into time sections having a negative value for phase error and time sections having a positive value for phase error, and phase error compensation is performed for each divided time section.

Meanwhile, as described above, since the phase error for each time may have a certain range vertically, it is necessary to specify the phase error for each time.

The analyzer 213 calculates a second-order polynomial by performing a linear regression analysis on the phase error in the divided time sections, and calculates a linear regression value by solving the second-order polynomial for the divided time sections.

Figure 7B:
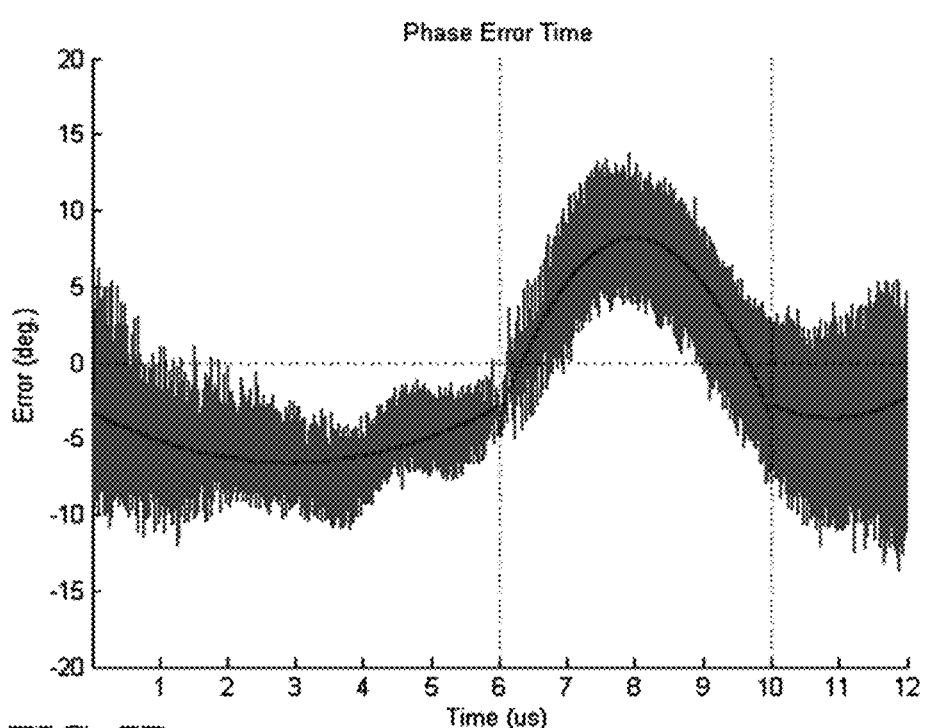

Specifically, as shown in FIG. 7B, the analyzer 213 calculates a second-order polynomial (or a curve equation) that best expresses n pieces of data (time (x) and error (y)) in the divided time sections. For example, a polynomial for a time section of 0 to 6 µs is calculated as $y=2.4948 \times 10^{-7}x^2-0.0018x-3.2187$, a polynomial for a time section of 6 to 10 µs is calculated as $y=-1.8827e \times 10^{-6}x^2+0.0376x-179.6595$, and a polynomial for a time section of 10 to 12 µs is calculated as $y=7.4654e \times 10^{-6}x^2-0.0204x+135.1129$.

The analyzer 213 calculates the linear regression value for each time by solving $y=2.4948 \times 10^{-7}x^2-0.0018x-3.2187$ for the time section of 0 to 6 µs, calculates the linear regression value for each time by solving $y=-1.8827e \times 10^{-6}x^2+0.0376x-179.6595$ for the time section of 6 to 10 µs, and calculates the linear regression value for each time by solving $y=7.4654e \times 10^{-6}x^2-0.0204x+135.1129$ for the time section of 10 to 12 µs. Here, the calculated linear regression value is estimated as a phase error.

The phase distorter 214 distorts the phase of the base band chirp signal in the divided time sections based on the phase error.

Figure 7C:
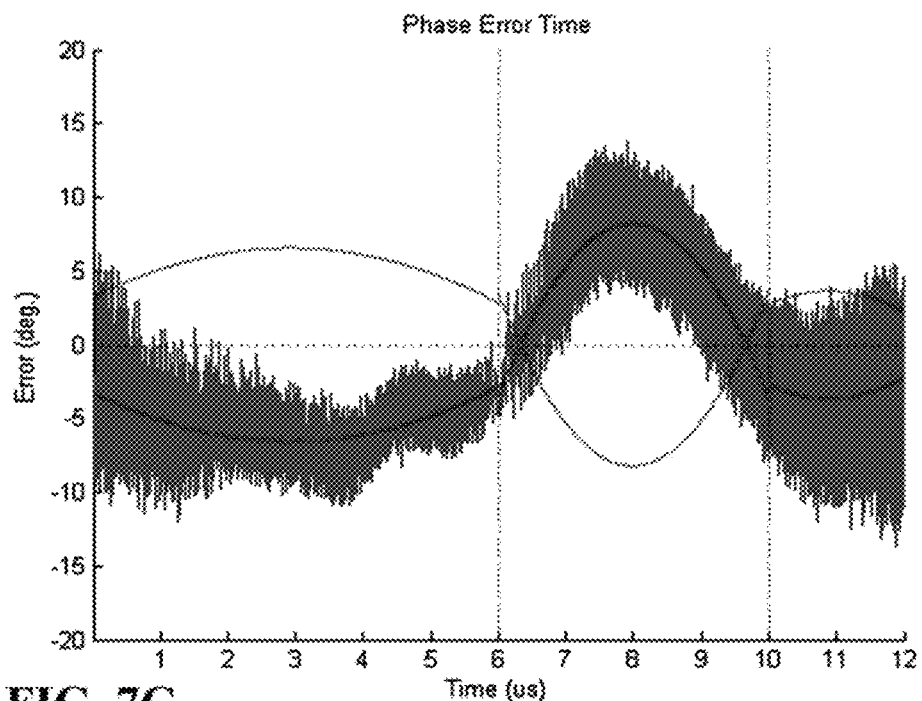
Figure 7D:
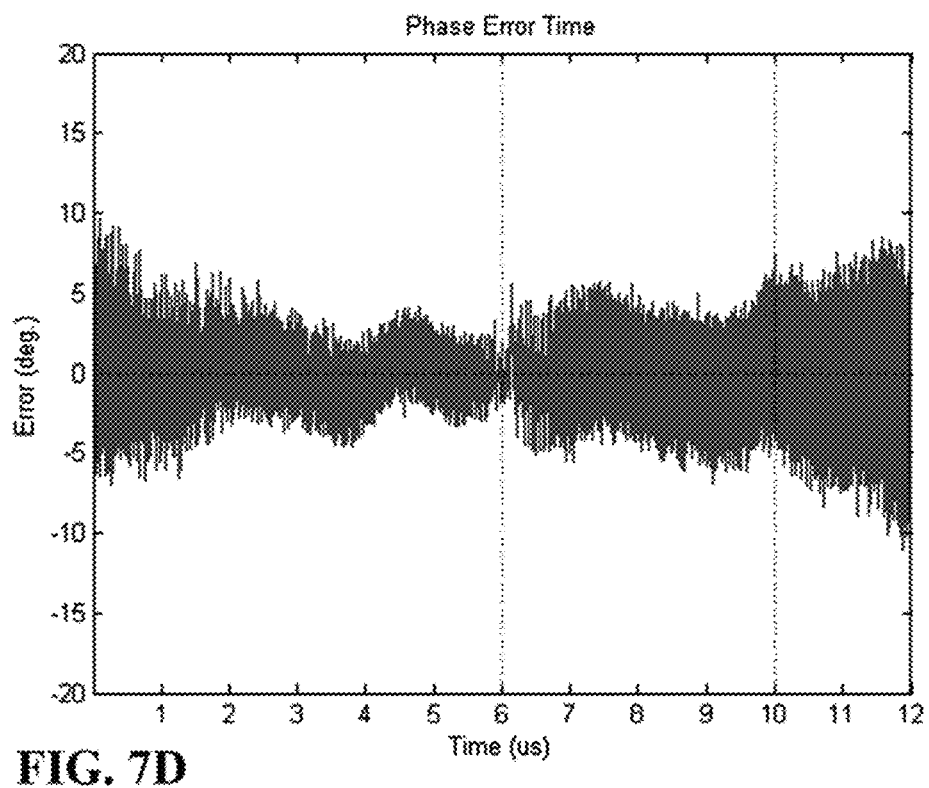

Specifically, the phase distorter 214 shifts the phase of the base band chirp signal for each divided time section based on the linear regression values received from the analyzer 213. That is, as shown in FIG. 7C, the phase distorter 214 subtracts the linear regression value from the phase of the base band chirp signal. Accordingly, the phase error of the RF band chirp signal is compensated as shown in FIG. 7D.

As described above, the apparatus for compensating phase error of chirp signal according to the second embodiment of the present invention divides the entire time sections into time sections having a negative value for phase error and time sections having a positive value for phase error (e.g., 0 to 6 µs, 6 to 10 µs, and 10 to 12 µs), and performs the pre-distortion for each time section, thereby efficiently compensating the phase error, and reducing the complexity compared to compensating the phase error for the entire time sections at once.

The detailed description above is to discuss embodiments of the present invention. In addition, the description above shows and describes embodiments, and the present invention may be used in various other combinations, modifications, and environments. In other words, changes or modifications are possible within the scope of the concept of the invention disclosed in the present specification, the scope equivalent to the disclosed contents, and/or the scope of the skill or knowledge in the art. The embodiments described above describes conditions for implementing the technical idea of the present invention, and embodiments in another state known in the art in using other inventions like the present invention and various changes required in the specific application and use of the present invention are also possible. Therefore, the above-detailed description of the invention is not intended to limit the present invention to the disclosed embodiments. In addition, the attached claims shall be construed as including other embodiments.

What is claimed is:

1. A method for compensating a phase error of an RF band chirp signal by pre-distorting a base band chirp signal, comprising:
   outputting, by a waveform generator, the base band chirp signal;
   outputting, by an RF modulator, the RF band chirp signal by upconverting the base band chirp signal;
   calculating a phase error over time for a predetermined time by comparing the RF band chirp signal with an ideal chirp signal;
   dividing the predetermined time into a plurality of time sections;
   combining neighboring time sections based on the phase error; and
   distorting a phase of the base band chirp signal in the combined time sections based on the phase error.

2. The method of claim 1, wherein the calculating of the phase error comprises calculating an average of the phase errors (a section error average) for each of the time sections, and calculating an average of the phase errors for all the plurality of time sections (an entire error average).

3. The method of claim 2, wherein the combining of the neighboring time sections comprises combining the time sections in which the absolute value of the section error average is greater than the absolute value of the entire error average.

4. The method of claim 3, wherein the calculating of the phase error comprises calculating an average of the phase errors for the combined time sections (a combined section error average).

5. The method of claim 4, wherein the distorting of the phase of the base band chirp signal comprises shifting the phase of the base band chirp signal based on the combined section error average.

6. The method of claim 4, wherein the distorting of the phase of the base band chirp signal comprises subtracting the combined section error average from the phase of the base band chirp signal.

7. A method for compensating a phase error of an RF band chirp signal by pre-distorting a base band chirp signal, comprising:

outputting, by a waveform generator, the base band chirp signal;

outputting, by an RF modulator, the RF band chirp signal by upconverting the base band chirp signal;

calculating the phase error over time for a predetermined time by comparing the RF band chirp signal with an ideal chirp signal;

dividing the predetermined time into a plurality of time sections based on a point where the phase error over time is 0;

distorting a phase of the base band chirp signal in the divided time sections based on the phase error.

8. The method of claim 7, further comprising calculating a second-order polynomial by performing a linear regression analysis on the phase error in the divided time sections.

9. The method of claim 8, further comprising calculating a linear regression value by solving the second-order polynomial for the divided time sections.

10. The method of claim 9, wherein the distorting of the phase of the base band chirp signal comprises shifting the phase of the base band chirp signal based on the linear regression value.

11. The method of claim 9, wherein the distorting of the phase the base band chirp signal comprises subtracting the linear regression value from the phase of the base band chirp signal.

* * * * *